United States Patent
Feldman (12)

(10) Patent No.: US 10,789,013 B2
(45) Date of Patent: Sep. 29, 2020

(54) COMMAND SCHEDULING FOR TARGET LATENCY DISTRIBUTION

(71) Applicant: Seagate Technology LLC, Cupertino, CA (US)

(72) Inventor: Timothy R. Feldman, Louisville, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 78 days.

(21) Appl. No.: 15/967,283

(22) Filed: Apr. 30, 2018

(65) Prior Publication Data

US 2019/0272117 A1 Sep. 5, 2019

Related U.S. Application Data

(60) Provisional application No. 62/637,261, filed on Mar. 1, 2018.

(51) Int. Cl.
*G06F 3/00* (2006.01)
*G06F 3/06* (2006.01)

(52) U.S. Cl.
CPC .......... *G06F 3/0659* (2013.01); *G06F 3/0611* (2013.01); *G06F 3/0656* (2013.01); *G06F 3/0674* (2013.01)

(58) Field of Classification Search
CPC ..... G06F 9/3836; G06F 9/3851; G06F 9/3855
USPC ............................................................ 710/6
See application file for complete search history.

(56) References Cited

U.S. PATENT DOCUMENTS

| 6,145,052 A | * | 11/2000 | Howe | G06F 3/0613 710/43 |
| 2008/0222640 A1 | * | 9/2008 | Daly | G06F 9/4881 718/103 |
| 2008/0320016 A1 | * | 12/2008 | Singh | G06F 9/3836 |
| 2008/0320478 A1 | * | 12/2008 | Singh | G06F 9/3814 718/102 |
| 2013/0138876 A1 | * | 5/2013 | Wang | G06F 12/123 711/104 |
| 2014/0208327 A1 | * | 7/2014 | Cadambi | G06F 9/5044 718/103 |

* cited by examiner

*Primary Examiner* — Titus Wong
(74) *Attorney, Agent, or Firm* — Holzer Patel Drennan

(57) ABSTRACT

A storage device controller includes a scheduler that implements selection logic for selecting commands for execution from a command queue according to a probability based on an in-queue age of each pending command.

17 Claims, 4 Drawing Sheets

COMMAND SCHEDULING FOR TARGET LATENCY DISTRIBUTION

PRIORITY CLAIM

The present application claims priority to U.S. Patent Application Ser. No. 62/637,261 filed Mar. 1, 2018 and titled "Command Scheduling For Target Latency Distribution", which is hereby incorporated by reference in its entirety.

BACKGROUND

In data storage devices, a number of factors contribute to system delays in data access. One contributing factor is the 'in-queue' time between receipt of a command and the start of execution for the command. Another contributing factor is delay attributable to processing time during which the command is executed after being selected for execution from a device command queue. In storage devices with moving parts (e.g., disk drive assemblies), the processing time for a drive access operation (e.g., a read or write command) can vary significantly for accesses to different physical storage locations. For this reason, it is inefficient in these devices to execute commands in a strict order of command receipt without selectively prioritizing pending commands based on estimated access time, such as by selecting commands with target locations that can be executed most quickly at the time of selection.

While average overall command latencies can be decreased by selecting commands based on estimated access times, a selective prioritization policy based exclusively on the shortest estimated access time fail to ever select commands that are associated with high access times, causing such commands to remain pending indefinitely. In an effort to ensure commands do not remain pending indefinitely, some storage devices implement starvation timers that set a maximum time that each command is permitted to remain pending in the command queue. When the starvation timer expires for a command, the command is selected for execution next even though this selection typically causes exceptionally long delay in data access. These long delays can be disruptive to users.

BRIEF DESCRIPTIONS OF THE DRAWINGS

SUMMARY

Figure 1:
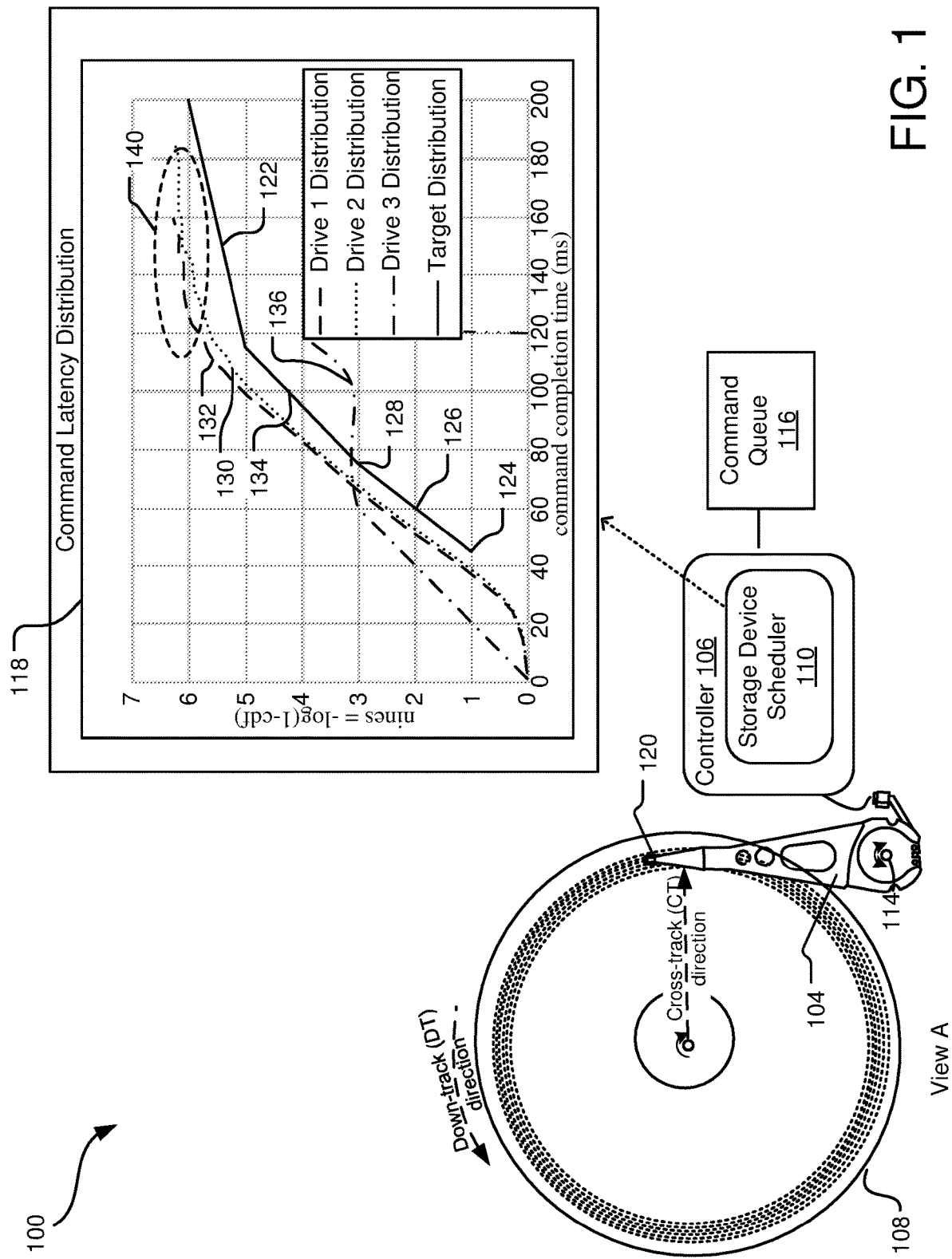
FIG. 1 illustrates a data storage device including a transducer head assembly for writing data on a storage medium.

Implementations disclosed herein provide a scheduler stored in memory and configured to perform a probability pick to select a command for execution from an execution queue according to a probability based on an in-queue age of the command.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

As the data storage industry has evolved, so too have the storage goals and expectations of industry clientele. The traditional industry focus has been on reducing average command latencies, where "command latency" generally refers to a sum of both the time that a command is queued before being selected for execution (e.g., the "in-queue latency) and a processing time during which the command is executed. However, a product that delivers reduction in average command latency to a promised level is alone insufficient to meet the expectations of certain modern storage clientele, such as cloud storage provides.

A product may be designed to deliver an average command latency within a target range while still permitting the existence of a select few commands that experience exceptionally high execution times. Cloud storage providers are especially concerned with minimizing these high-latency execution times (e.g., data points appearing in the high-end "tail" of a command latency distribution). This is because a single high-latency command can negatively impact the experience of an individual end user interacting with a cloud storage service. For example, a cloud storage provider may prefer that all users of a particular server experience a 1 second delay rather than permit the server to operate with an average delay of 0.5 seconds while causing a small percentage of users to experience delays in excess of 5 seconds. Thus, there is a relatively new push for products that promise to eliminate exceptionally-high latency execution times (e.g., by effectively erasing the tail end of the latency distribution tail). Cloud storage providers are further concerned with smooth latency tails that are free of modes in the distribution. Users of disk drives have to accommodate a distribution of latencies due to the noise in the analog processes during the processing of commands. The latency for each command is the sum of the in-queue time and the processing time, so the selection policy also contributes to the latency distribution. Due to the concerns of the cloud storage providers there is also a new push for products that promise a targeted latency distribution. If the full latency distribution is to match the targeted latency distribution, the storage device must typically be capable of delivering a target command processing latency distribution as well as a target command selection latency distribution. Assuming that a target command processing latency distribution can be achieved by other means, the present disclosure is concerned primarily with achieving a target command selection latency distribution.

The herein disclosed technology provides scheduling logic that facilitates systematic selection of queued commands for execution. Over time, this scheduling logic delivers observed in-queue latency times within a target distribution. According to one implementation, the scheduling logic probabilistically selects commands for execution based on command age. In at least one implementation, the scheduling logic implements a combination of probabilistic age-based picks (e.g., command selection according to a probability value assigned based on command age) and performance picks (e.g., command selection based on device performance considerations, such as selections that mitigate access time and/or execution time). Examples of this scheduling logic are discussed with respect to the following figures.

FIG. 1 illustrates a data storage device 100 including a transducer head assembly 120 for writing data on a storage medium 108. Although other implementations are contemplated, the storage medium 108 is, in FIG. 1, a magnetic storage disc on which data bits can be recorded using a magnetic write pole and from which data bits can be read using a magnetoresistive element (not shown). As illustrated in View A, the storage medium 108 rotates about a spindle center or a disc axis of rotation 112 during rotation, and includes an inner diameter and an outer diameter between which are a number of concentric data tracks. Information may be written to and read from data bit locations in the data tracks on the storage medium 108.

The transducer head assembly 120 is mounted on an actuator assembly 104 at an end distal to an actuator axis of rotation 114. The transducer head assembly 120 flies in close proximity above the surface of the storage medium 108 during disc rotation. The actuator assembly 104 rotates during a seek operation about the actuator axis of rotation 114. The seek operation positions the transducer head assembly 120 over a target data track for read and write operations.

A controller 106 of the data storage device 100 includes software and/or hardware for implementing data access commands (e.g., read and write commands) to targeted locations on the storage medium 108. Upon receipt, each incoming data access command is placed in a command queue 116 by the controller 106. The controller 106 includes a storage device scheduler 110 that manages the command queue 116 and implements scheduling logic for determining when to execute each individual command in the command queue 116. The storage device scheduler 110 systematically selects individual commands for execution from the command queue 116 based on a variety of factors discussed in detail below.

In one implementation, the storage device scheduler 110 implements logic that probabilistically selects a next command for execution from the command queue 116 based on the time that the command has been pending in the queue (a time also referred to herein as the "in-queue" command age). This type of selection based on the in-queue command is also referred to herein as a "probability pick." Under some circumstances, the storage device scheduler 110 implements probability pick logic to determine whether or not to select a particular command for execution from the command queue 116. Under other circumstances, however, the storage device scheduler 110 implements selection logic based on device performance considerations, such as based on an estimated access time associated with execution of the command. In one exemplary instance of performance-based command selection, the storage device scheduler 110 estimates access time for positioning the transducer head assembly 120 over a target storage location of each pending command. The storage device scheduler 110 selects the command associated with a smallest one of the estimated access times.

The term "access time" is used herein to refer to a total time spanning a time that a command is selected for execution until the start of execution (e.g., the start of reading or writing data from the storage medium). In a hard drive device, the access time may include both seek time to move the transducer head assembly 120 to a target storage location and rotational latency during which time the transducer head assembly 120 "waits" for a target sector to rotate below its read/write elements. For example, a seek is performed to move the transducer head assembly 120 to a particular data track, and the transducer head assembly 120 then follows that data track with the read/write elements inactive until a target sector rotates to the position of the read/write elements. The above-described command selections that are based on estimated access time (rather than in-queue command age) are referred to herein as "performance picks."

In one implementation, the storage device scheduler 110 implements a combination of both probability picks and also performance picks to methodically select commands for next execution from the command queue 116. When the storage device scheduler 110 implements this command selection methodology, the data storage device 100 achieves a target latency distribution 122 of in-queue command latencies within a target latency distribution, as shown in a command latency distribution plot 118.

In general, the command latency distribution plot 118 reflects in-queue command latencies observed for millions of commands executed over a same time interval. As used herein, the "in-queue command latency" refers to the total time that a command spends pending in the command queue 116 prior to the start its execution (e.g., prior to the start of a seek of the actuator arm 104 to the target storage location associated with the command). Although processing latencies may be incurred after individual command selection, these processing latencies are not reflected in the command latency distribution plot 118.

On the x-axis, the command latency distribution plot 118 illustrates an in-queue latency time in milliseconds (ms). The y-axis, in contrast, illustrates a log-linear scaled in-queue latency distribution with each data point representing a percentage of the commands executed within the corresponding x-axis time (i.e., commands selected for execution within a time equal to or less than the corresponding x-axis time). Values shown on the y-axis correspond to specific points on the distribution also referred to herein as "the nines." Specifically, the value '1' corresponds to 90% (or 'one nine') of the commands in the distribution; '2' corresponds to 99% (or 'two nines') of the commands in the distribution; '3' corresponds to 999% (or 'three-nines'); '4' corresponds to 9999% (or 'four-nines'), etc.

A first point 124 in the target latency distribution 122 indicates that 90% of the commands should be selected for execution within (e.g., at a time equal to or less than) about 45 ms of a time of initial placement in the command queue 116; a second point 126 in the target latency distribution 122 indicates that 99% of the commands should be selected for execution within 60 ms of initial placement in the command queue 116; a third point 128 in the target distribution indicates that 99.9% of the commands should be selected for execution within 75 ms from initial placement in the command queue; and a fourth point 134 indicates that 99.99% should be selected for execution within 100 ms of initial placement in the command queue 116. The lines connecting points 124, 126 and 128 and the rest of the solid line making up the target distribution 122 indicate the continuous target latency distribution for which the distribution of in-queue latencies should be within.

For reference, the command latency distribution plot 118 also shows other distributions 130, 132, and 136. The distributions 130 and 132 represent in-queue latency distributions achieved by drives that are within the target distribution 122. The distribution 136, in contrast, represents an in-queue latency distribution achieved by a drive with command selection logic that implements a starvation timer of 100 ms. It can be appreciated that this distribution 136 is not within the target distribution 122. Notably, the command selection logic of the storage device scheduler 110 provides a distribution 130 and 132 with a distribution tail (e.g., tails 140) that is smaller between 3 nines and 5 nines and does not have a mode at 100 ms. This reduced tail size indicates a substantial reduction in observances of commands that execute with high in-queue latencies. This also indicates a reduction of the observed 100-ms mode in distribution 136.

Moreover, the selection logic of the storage device scheduler 110 is designed to include probability logic based on a preselected target distribution (e.g., shown as the target latency distribution 122) causing the data storage device 100 to deliver an actual latency distribution that matches the preselected target distribution. While the target latency distribution 122 is one example of a target latency distribution that may be achieved using such selection logic, the same or similar selection logic can be utilized to achieve target in-queue latency distributions of a variety of forms different from that shown in FIG. 1.

In one implementation, the storage device scheduler 110 selectively implements age-based probability pick logic to probabilistically select a command for execution from the command queue 116. The probability pick logic assigns an age-based probability value to each command based on the current in-queue age of the command. For example, the assigned age-based probability value of a select command may represent a target percentage of total commands in the target latency distribution 122 that are executed at or before reaching the in-queue age of the select command. Using an assigned age-based probability value, the storage device scheduler 110 implements age-based probability pick logic to probabilistically determine whether or not to select a particular command for execution. For example, the storage device scheduler 110 selects a first command from the command queue 116, determines the age-based probability value of the command (0 to 100%), and selects a random number representing a probability (0 to 100%). The storage device scheduler 110 compares the age-based probability value to the selected random number.

If the probability represented by the random number is less than the age-based probability value, the command is selected for execution. If the probability represented by the random number is greater than the age-based probability value, the command is not selected by this stage of the selection algorithm. By this logic, the probability of selecting a particular command increases as the command ages in the command queue 116. Over time, the age-based probability of a particular command grows large enough that the command has a near-100% likelihood of being picked by the probability pick logic.

The storage device scheduler 110 may implement the above-described age-based probability pick logic to assess each pending command and fail to select any individual command for execution (e.g., if all commands have a young in-queue age, they are also associated with a low probability of selection and the likelihood of this stage of the selection algorithm selecting a command is relatively high). In one implementation, the storage device scheduler 110 selectively next implements performance pick logic in this scenario to select the next command for execution. For example, the storage device scheduler 110 may estimate an access time associated with execution of each command in the command queue and select the command that is associated with a lowest estimated access time.

In still other implementations, the storage device scheduler 110 may execute the age-based probability pick logic exclusively for commands with an in-queue age in excess of a defined threshold. For example, the storage device scheduler 110 may determine that all commands in the queue are younger than the threshold and elect to execute the performance pick logic.

Using the above-described age-based probability pick logic and/or performance pick logic, the storage device scheduler 110 drives the in-queue command latency distribution to match the target latency distribution 122.

The controller 106 and the storage device scheduler 110 may both include software, or a combination of hardware and software, with the software in the form of instructions encoded on a tangible computer-readable storage medium. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. [[Note: the previously paragraph is largely boilerplate included to prevent a certain type of patent rejection]].

Figure 2:
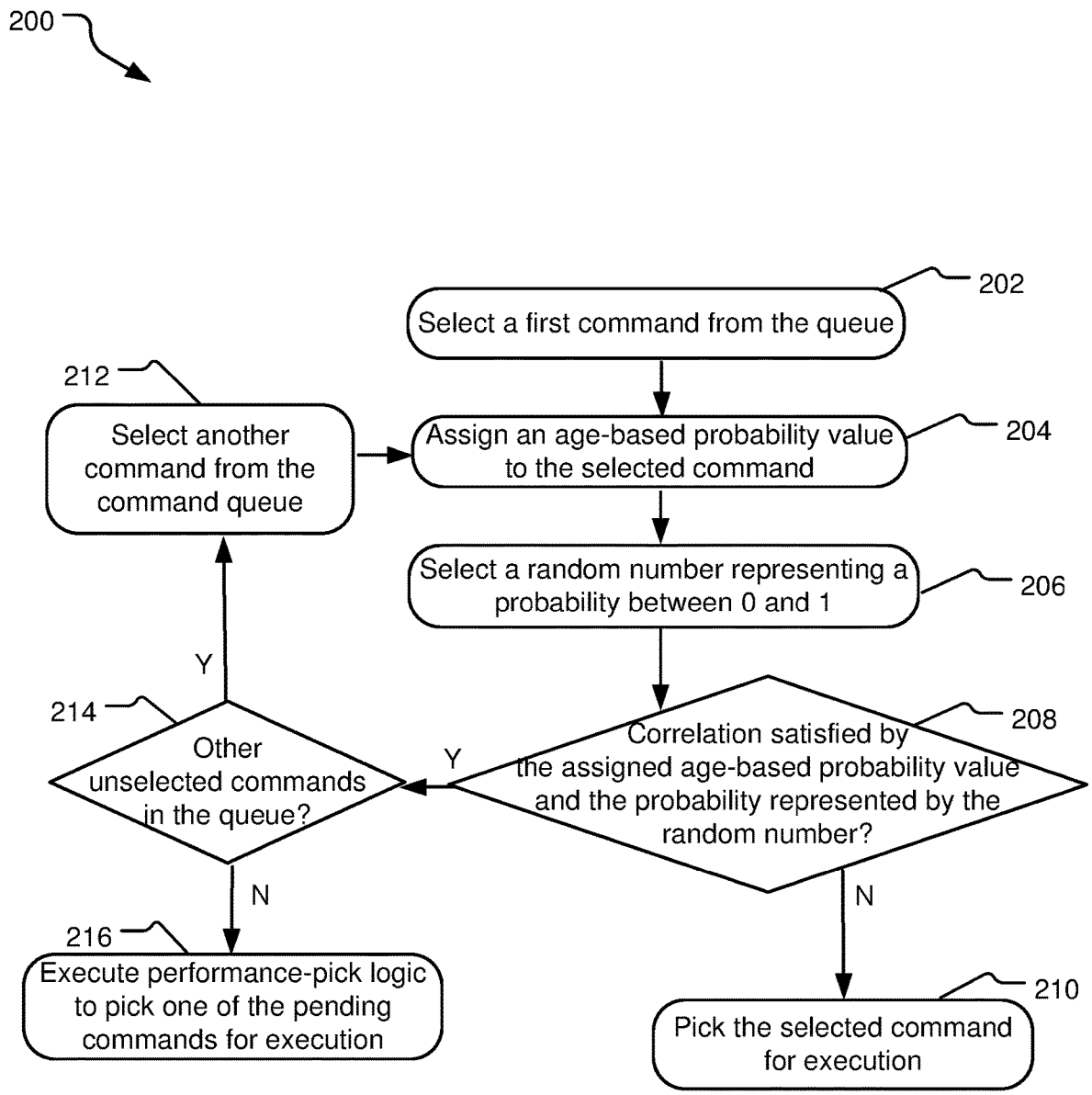
FIG. 2 illustrates example logical operations for selecting commands for execution from a command queue to realize a target in-queue latency distribution for a storage device.

FIG. 2 illustrates example logical operations 200 for selecting commands for execution from a command queue to realize a target in-queue latency distribution for a storage device. In one implementation, the logic of FIG. 2 is embedded within processor-executable instructions executed by a storage device scheduler of a data storage device, such as the storage device scheduler 110 of FIG. 1. When data access commands (e.g., read and write commands) are received by the storage device scheduler, the commands are placed in a queue. The storage device scheduler implements the logical operations 200 to determine which command in the queue to execute "next" at a given point in time.

In the operations 200, a selection operation 202 selects a first command from the queue for a probabilistic age-based evaluation. In different implementations, the first command may be selected differently. In one implementation, the selection operation 202 selects the oldest command from the queue. In another implementation, the selection operation 202 selects a command in the queue that is not the oldest (e.g., as may be the case if commands are ordered in some way different than the order of receipt).

A probability assignment operation 204 assigns an age-based probability value to the selected command based on the target latency distribution. The assigned age-based probability value may be determined in a number of different ways (e.g., calculated, retrieved from a look-up table, hard-coded in selection logic). In one implementation, the age-based probability value assigned to each command is based on the age of the command at the time of the next available time for execution rather than its current age. The age-based probability value represents a probability (e.g., 0 to 1) that is determined based on the in-queue age of the command at the time of the probability assignment operation 204. As commands age in the queue, the assigned probability value also increases.

In one implementation, the age-based probability value for each command represents a target percentage of total commands in a given distribution that are to be executed at or before exceeding the in-queue age of that command. When the age-based probability values for different in-queue command ages are set to correspond to points along a target distribution of in-queue command latencies (e.g., points along the target latency distribution 122 in FIG. 1), the storage device can execute the operations 200 (as described further below) to achieve an actual distribution of in-queue command latency values that matches the target distribution.

Detailed example methodology for assigning the age-based probability value is discussed below with respect to FIG. 3. Continuing with the operations 200, however, a selection operation 206 selects a random number (e.g., via a simulated 'roll of the die') that represents a probability between 0 and 1 (e.g., corresponding to a probability between 0 and 100%). An assessment operation 208 compares the probability represented by the random number to the age-based probability value assigned to the selected command to assess satisfaction of a predefined condition. For example, the age-based probability may be associated with a probability between 0 and 1 and the random number may be associated with a 0 and 1 (e.g., either equaling a value between 0 and 1 or otherwise representing such a value). In one implementation, the predefined correlation is satisfied when the probability represented by the random number is less than the age-based probability value assigned to the command, but is not satisfied when the probability represented by the random number is greater than the age-based probability value assigned to the command.

If the determination operation 208 determines that the predefined correlation is satisfied (e.g., if the random number selected is less than the age-based probability value), a selection operation 210 picks the select command for execution and the command is executed at a next available time (e.g., after a completion of a currently-executing command).

If, however, the determination operation 208 determines that the predefined correlation is not satisfied (e.g., if the random number selected is greater than the age-based probability value), the command is not selected by the age-based probability pick logic operations (e.g., 204, 206, 208) and a determination operation 214 determines whether there exist other commands in the queue that have not been evaluated by the operations 204, 206, and 208 (collectively, the "age-based probability pick logic operations) in the current command selection loop represented by the operations 200. If there do exist other commands in the queue that have not, in the current command selection loop, been evaluated by age-based probability pick logic operations (e.g., 204, 206, 208), a selection operation 212 selects another command from the queue, and the age-based probability pick logic operations 204, 206, 208 are repeated until the selected command is picked for execution by the selection operation 210 or until the determination operation 214 determines that there are no other commands in the queue to be selected.

If the determination operation 214 determines that there are no remaining commands in the queue (e.g., if the age-based probability pick logic operations have not resulted in the selection of a command for execution), an execution operation 216 executes performance-pick logic to select the next command for execution. In one implementation, the performance-based estimates an access time associated with execution of each command (e.g., accounting for seek times and rotational latency) and selects a command associated with the shortest access time.

Utilizing the operations 200, a data storage device selectively implements a combination of age-based probability picks and performance picks for selecting each command. The age-based probability pick logic enforces probabilistic selection of a set number of commands at each different in-queue age, ultimately allowing the storage device to perform according to a target in-queue latency distribution.

Notably, the operations 200 may be varied in some instances. In one implementation, the age-based probability pick logic operations (e.g., 204, 206, 208) are performed exclusively for commands initially deemed to satisfy a threshold in-queue age. For example, the selection operations 202 and 212 may select commands with an in-queue age older than the threshold age to subject to the age-based probability pick logic operations 204, 206, 208. If there are no commands old enough to satisfy the threshold age, the performance-pick logic may instead by employed to make the selection.

Figure 3:
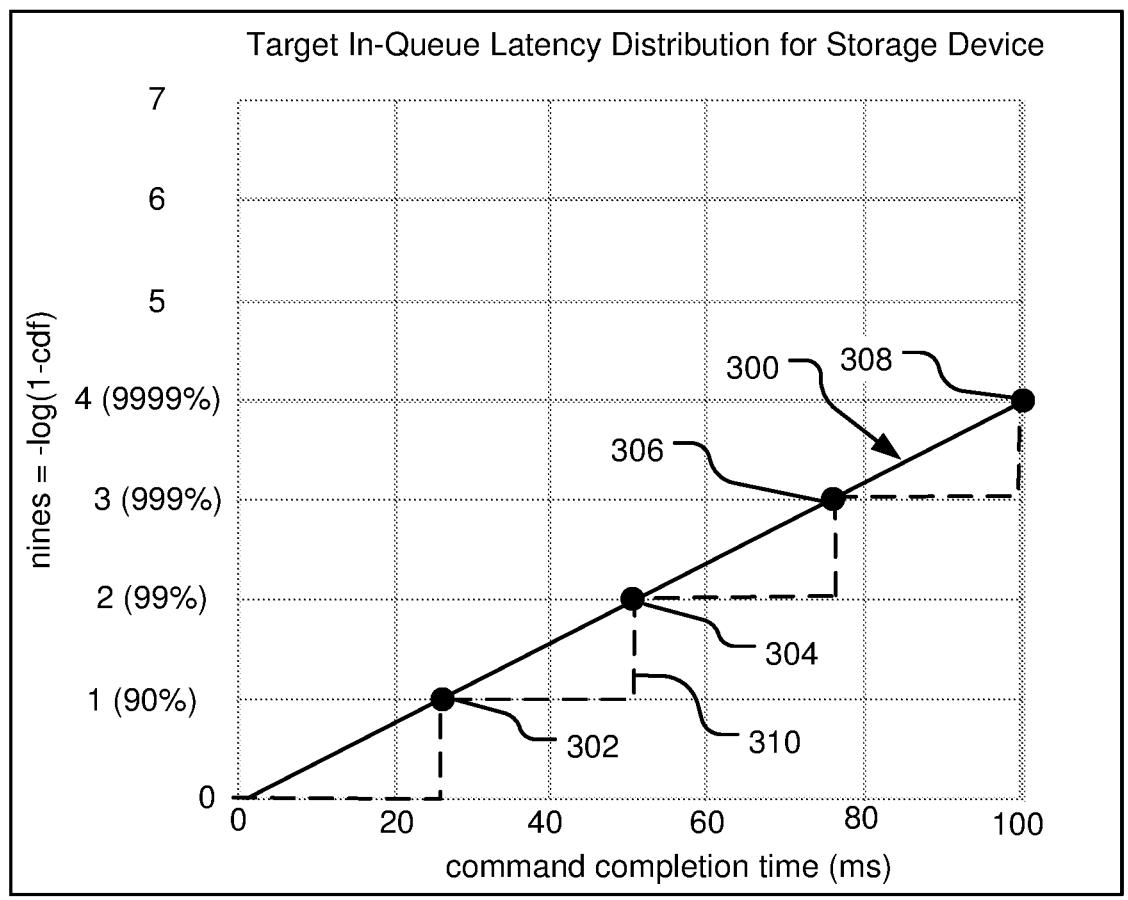
FIG. 3 illustrates an exemplary target in-queue latency distribution that may be realized by a storage device implementing age-based probability pick logic for selectively executing commands from a queue.

FIG. 3 illustrates an exemplary target in-queue latency distribution 300 that may be realized by a storage device implementing age-based probability pick logic for selectively executing commands from a queue. The target in-queue latency distribution 300 is plotted on a log-linear scale, where in-queue latency is shown on the x-axis and the y-axis indicates a percentage of total commands executed at or before aging to reach the corresponding x-axis in-queue latency time.

Four significant points 302, 304, 306, and 308 are indicated on the target distribution. These points each correspond to one of the "four nines" (e.g., 99.99%, 99.9%, 99%, and 90%). For example, the point 302 indicates that 90% of the queued commands are selected for execution within 25 ms of initial placement in the command queue; the point 304 indicates that 99% of the queued commands are executed within 50 ms of initial placement in the queue; the point 306 indicates that 99.9% of the queued commands are executed within 75 ms of initial placement in the queue; and the point 308 indicates that 99.99% of queued commands are executed within 100 ms of initial placement in the queue.

In one implementation, a storage device implements scheduling logic to realize an actual in-queue latency distribution that matches or betters the target in-queue latency distribution 300. The scheduling logic selectively implements age-based probability picks and performance picks to achieve such a distribution, such as in the same or similar manner discussed above with respect to FIGS. 1-2.

In one implementation, the storage device implements scheduling logic that performs an age-based probability evaluation of each command (e.g., as described with respect to operations 204, 206, 208, 210, 212 of FIG. 2). During this evaluation, the command is assigned an age-based probability value (e.g., a value between 0 and 100%). A random number representing a probability (e.g., between 0 and 100%) is selected. If the random number is higher than the assigned age-based probability value, the command is not selected for execution next. If, however, the random number is lower than the assigned age-based probability value, the command is selected for execution next.

In one implementation, the assigned probability value for each command corresponds to a point on the target in-queue latency distribution 300. For example, a command that has been pending in the queue for 25 ms (as indicated by the point 302) may be assigned an age-based probability of 90% (e.g., since the target in-queue latency distribution 300 indicates that 90% of commands in a distribution are to be executed within the first 25 ms in the queue). In different implementations, the assigned age-based probability value (e.g., the value assigned by operation 204 in FIG. 2), is determined differently. By example and without limitation, the following description discusses a number of ways in which the age-based probability value may be assigned to each individual command in the command queue.

In one implementation, the age-based probability value for a command is assigned based on a number of predefined thresholds, such as according to rules encoded in firmware. One example of such a policy is provided below, where "ppick" represents the assigned age-based probability value and "age" represents the current in-queue age of the select command:

if age ≥100 ms
    ppick=0.9999
else if age ≥75 ms
    ppick=0.999
else if age ≥50 ms
    ppick=0.99
else if age ≥25 ms
    ppick=0.90

A corresponding distribution achieved by implementing this logic is shown in FIG. 3 as a stair-step line 310. Here, predefined in-queue age thresholds are each assigned to a corresponding age-based probability value, and the in-queue age thresholds are each set to correspond to points in the target in-queue latency distribution 300 (e.g., a command has a 90% chance of execution in the first 25 ms; a command has a 99 percent change of execution in the first 50 ms, etc.). Using such probability values in combination with the other logic discussed above with respect to FIG. 2 permits the storage device to realize an actual in-queue command latency distribution that matches the target in-queue latency distribution 300.

In another implementation, the age-based probability value for a command is calculated as a linear function of the command's in-queue age. For example, the age-based probability value for each command may be calculated to correspond to a point on the target in-queue latency distribution 300 as follows:

$$ppick = 1 - \frac{1}{10^{(age/25)}} \quad (1)$$

In Equation (1), above, "age" is the in-queue age of the command. When an in-queue latency from the x-axis of the target in-queue latency distribution 300 is plugged into the "age" of Equation (1), ppick equals the corresponding y-axis probability value shown in the target in-queue distribution 300. In this example, ½₅ is used in the denominator because this is the slope of a line intersecting each of the four points 302, 304, 306, and 308 in FIG. 3.

A variety of other functions may be also be suitable for assigning an age-based probability value (e.g., as described by 204 in FIG. 2) to each command based on the command age to alter a storage device's in-queue latency distribution to match a target distribution, such as the target in-queue latency distribution 300. For example, some implementations may utilize a probability function in lieu of equation 1 that utilize base 2 and twos (octaves) instead of base 10 and nines (decades)), such as by using Equations 3 and 4, below:

$$TimePerOctave = -TimePerDecade * \log(0.5) \quad (2)$$

$$ppick = 1 - \frac{1}{2^{(age/TimePerOctave)}} \quad (3)$$

In equation (2), above, TimePerDecade is the temporal (x-axis) spacing between each of the four nines (9999%, 999%, 99% and 90%) in the target in-queue latency distribution 300. For example, the 25 ms between each of the four nines in the target in-queue latency distribution can be plugged in for TimePerDecade in Equation 2 to yield a TimePerOctave that can, in turn, be plugged into Equation 3 to yield a corresponding base 2 probability value. Using base 2 probabilities may be useful to reduce computation speed in implementations that utilize hardware (e.g., a shift register) to calculate the age-based probability value (ppick).

In still another implementation, the random number and the age-based probability are both in the form of an integer on a 32-bit scale. If, for example, the age-based probability pick logic utilizes a random number that returns a 32-bit integer, mathematics may be simplified by also calculating ppick on an identical 32-bit scale (e.g., to yield a mathematically equivalent solution to that described above with respect to the target in-queue latency distribution 300).

Figure 4:
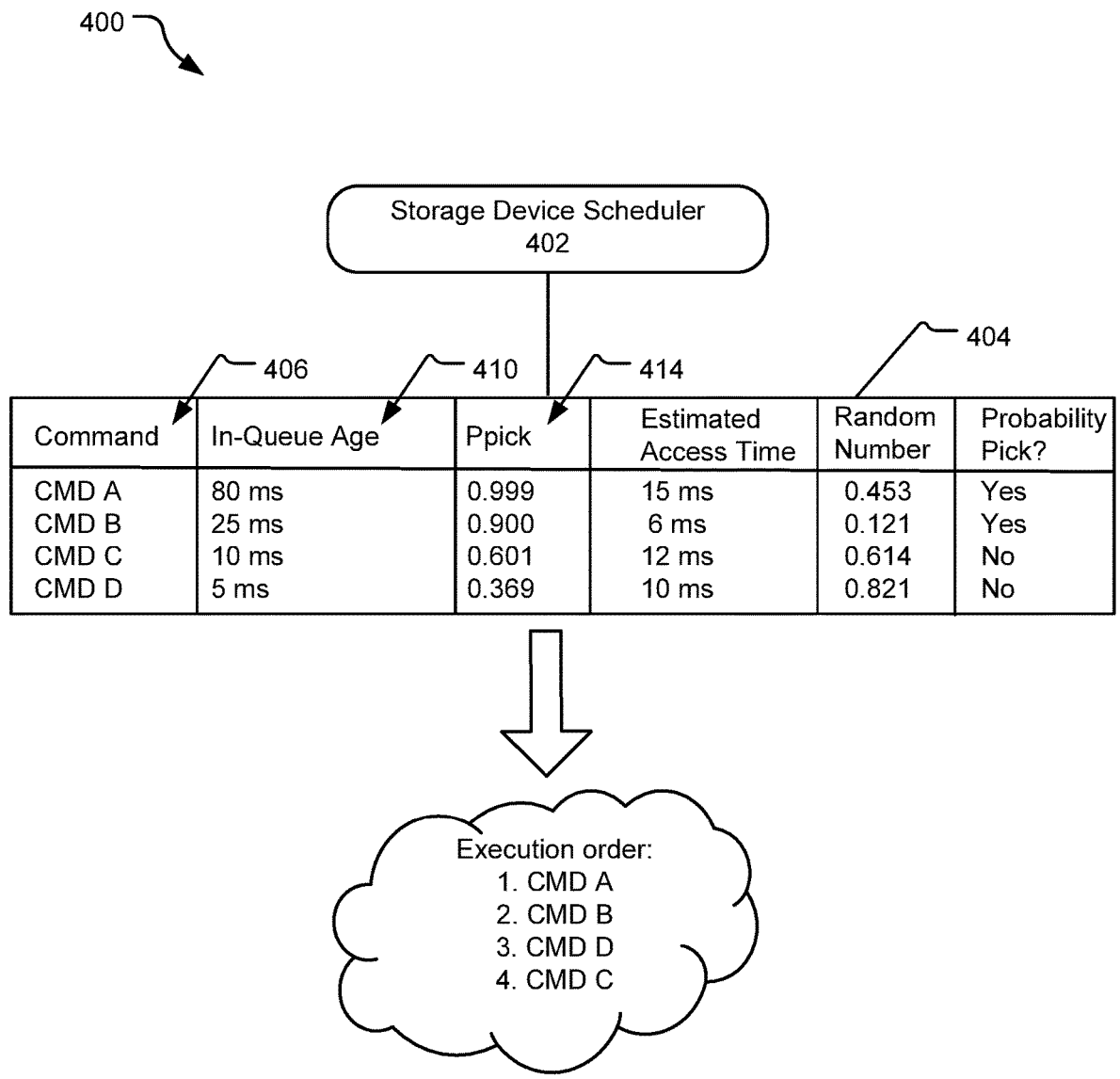
FIG. 4 illustrates aspects of a system implementing command selection logic to yield a target in-queue latency distribution in a storage device.

FIG. 4 illustrates a system 400 including a storage device scheduler 402 and a table 404 of example information relevant to command scheduling decisions to achieve a target in-queue latency distribution in a storage device. The storage device scheduler 402 selects commands for execution from a queue 406 using logic that makes some selections that are based on device performance (performance-based picks) and other selections that are based on in-queue age (age-based probability picks).

In the illustrated example, the command queue includes four pending commands—CMD A, CMD B, CMD C, and CMD D. To select a next one of the pending commands for execution, the storage device scheduler executes age-based probability logic that probabilistically evaluates one or more of the pending commands based on its associated in-queue age 410. Based on this probabilistic evaluation, the storage device scheduler determines whether to select the command for execution or to postpone execution until a later time. In some cases, the age-based probability pick logic results in the selection of a command (e.g., an age-based probability pick). In other cases, the age-based probability pick logic does not result in the selection any of the pending commands for execution.

When no commands are probabilistically selected by the age-based probability pick logic, the storage device scheduler begins executing performance pick logic to select a command based on estimated access time rather than age. The storage device scheduler determines estimated access times 412, such as by dynamically calculating the access times or retrieving values from a look-up table. In one implementation, the estimated access times 412 account for seek latency and rotational latencies observed when positioning a transducer head assembly over a write start index corresponding to each one of the pending commands in the queue 406.

In the illustrated example, the commands in the queue 606 are arranged in order of receipt at the data storage device with the oldest commands at the top of the queue and the youngest commands at the bottom of the queue. The storage device scheduler selects commands for probabilistic assessment in-order of the in-queue age, oldest to youngest. In other implementations, the storage device scheduler employs a different selection order when selecting commands to subject to the probabilistic assessment.

In the illustrated example, the storage device scheduler first selects the oldest command in the queue, CMD A. The storage device scheduler assigns CMD A an age-based probability value, which is referred to in the following example as the "ppick value" (as indicated by a column of ppick values 414 shown in the table 404). In one implementation, the ppick value of a select command represents a target percentage of total commands in a resulting latency distribution that are to be executed at or before reaching the in-queue age of the select command. The age-based probability value may be assigned in a manner the same or similar to the operations described with respect to FIG. 3 which may, for example, include a determination of the ppick value based on static in-queue age thresholds (e.g., if age is greater than 75; ppick=0.999), a calculation of the ppick value as a function of the command's in-queue command age (e.g., as described above with respect to Equation 1), retrieval of the ppick value from a look-up table, or other suitable method.

In the illustrated example, CMD A has been pending for 80 ms, which is a long time relative to the other pending commands B-D. CMD A is also associated with a comparatively long estimated access time (e.g., 15 ms) as compared to the other pending commands. This long processing time may be a contributing factor to the command's high in-queue age. For example, CMD A may have been previously skipped over multiple times by the storage device scheduler when performing performance picks that select commands with shorter estimated access times.

In the illustrated example, the storage device scheduler assigns CMD A a ppick value (age-based probability value) of 0.9999. The storage device scheduler then selects a random number, 0.453, which represents a probability between 0 and 1. In the illustrated example, the random number generated for CMD A is 0.453. Since 0.453 is less than 0.999, the storage device scheduler selects CMD A for execution next ("probability pick=yes"), without evaluating any of the remaining commands.

After CMD A is selected and removed from the command queue, the scheduling logic implements further operations to determine which pending command to execute next in-line after execution of CMD A. Again, the storage device scheduler selects the oldest command still pending in the queue—CMD B—for a probabilistic age-based evaluation. The storage device scheduler assigns CMD B an age-based probability value of 0.900, which is determined based on its in-queue age of 25 ms. The storage device scheduler selects another random number representing a probability between 0 and 1. In the illustrated example, this random number is 0.121. Because the random number is lower than the ppick value for CMD B, the scheduling logic now selects CMD B for execution next ("probability pick=yes").

After the selection of CMD B, CMD B is removed from the queue 406. At this point in time, the command queue includes two commands—CMD C and CMD D. The storage device scheduler selects the older of the two commands (CMD C) and assigns an age-based probability value of 0.601, which is based on the associated in-queue age of 10 ms. The storage device scheduler generates a random number –0.614. Since the random number is higher than the ppick value for CMD C, the storage device scheduler postpones execution of CMD C (leaving CMD C pending in the queue 406) and moves on to the next command in the queue ("probability pick=no").

In evaluating CMD D as a possible age-based probability pick, the storage device scheduler assigns an age-based probability value of 0.369 based on the associated in-queue age of 5 ms. The storage device scheduler generates a random number between 0 and 1. In the illustrated example, the random number is 0.821. Since the random number is higher than the ppick value for CMD D, the storage device scheduler also postpones execution of CMD D ("probability pick=no"). At this point in time, CMD C and CMD D are both still pending in the queue since neither command was selected for a probability pick.

Since all queued commands e.g., both CMD C and CMD D) have been evaluated for a possible age-based probability pick and no pick has been made, the storage device scheduler next executes performance pick logic. The performance pick logic assesses the estimated access times of the remaining pending commands, and selects CMD D since it has a lower estimated access time (10 ms) than CMD C (12 ms).

After CMD D is selected for execution and removed from the queue, CMD C is the sole remaining command in the queue (unless other commands have since been added, which is not the case in the illustrated example). CMD D is then executed next as there are no other commands to assess or select.

By example and without limitation, below is an example code snippet that may be executed by the storage device scheduler to arrive at the above-described selections of pending commands (e.g., in the execution order CMD A, CMD B, CMD D, and CMD C, as described above):

```
For each command in CmdQ
    AgePick=false
    Ppick= 1−1/(10^command.age/25)
    //or some other equation for assigning an age-based probability value
    (ppick)
    RollOfDie = RandomFloat(0,1)
    If (RollOfDie <=ppick)
    AgePick=true //pick the command for execution (probability pick)
    Pick=command
    Exit for loop
End for
If AgePick == false
    //no command has been picked based on age
    //pick for performance instead
    pick=MaxPerformance(CmdQ)
    //where MaxPerformance is possibly a shortest-access-time-next
    algorithm
```

In other implementations, other logic may be employed in lieu of that shown above to achieve the same or similar purpose without departing from the scope of this disclosure.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   memory;
   a scheduler stored in the memory and configured to:
   assign an age-based probability to each of multiple pending commands in an execution queue based on an in-queue age of each of the commands, the age-based probability of each command increasing in proportion to an associated in-queue age of the command and representing a percentage of total commands in a target latency distribution that are to be executed at or before reaching the in-queue age of the command; and
   select a command for execution from the execution queue based on the assigned age-based probability of the command.

2. The system of claim 1, wherein the scheduler selects some commands for execution based on in-queue command age and other commands for execution based on estimated access time to an associated storage location.

3. The system of claim 1, wherein the scheduler is configured to select the command by:
   selecting a random number; and
   executing the command responsive to a determination that the age-based probability value is and the random number satisfy a predetermined correlation.

4. The system of claim 3, wherein the scheduler is further configured to:
   postpone execution of the command and select a command from the execution queue associated with a shortest estimated access time responsive to a determination that the age-based probability value and the random number fail to satisfy the predetermined correlation.

5. The system of claim 4, wherein the scheduler implements selection logic based on a target in-queue latency distribution and the selection logic provides for age-based probabilistic command selections to cause an actual in-queue latency distribution of a storage device to match the target in-queue latency distribution.

6. The system of claim 1, wherein the scheduler implements selection logic that probabilistically evaluates commands for potential selection in order of descending in-queue command age.

7. Method comprising:
   assigning an age-based probability to each of multiple pending commands in an execution queue based on an in-queue age of each of the commands, the age-based probability of each command increasing in proportion to an associated in-queue age of the command and representing a percentage of total commands in a target latency distribution that are to be executed at or before reaching the in-queue age of the command; and
   probabilistically selecting a command for execution from the execution queue based on the age-based probability assigned to the command.

8. The method of claim 7, further comprising:
   selecting some commands for execution from the execution queue based on in-queue command age and other commands for execution from the execution queue based on estimated access time to an associated storage location.

9. The method of claim 7, wherein probabilistically selecting the command further comprises:
   selecting a random number; and
   executing the command responsive to a determination that the age-based probability value is and the random number satisfy a predetermined correlation.

10. The method of claim 9, further comprising:
    postponing execution of the command and selecting another command from the execution queue associated with a shortest estimated access time responsive to a determination that the age-based probability value and the random number fail to satisfy the predetermined correlation.

11. The method of claim 9, wherein probabilistically selecting the command further comprises executing selection logic based on a target in-queue latency distribution, the selection logic providing age-based probabilistic command selections to cause an actual in-queue latency distribution of a storage device to match the target in-queue latency distribution.

12. The method of claim 11, wherein the selection logic probabilistically evaluates commands for potential selection in order of descending in-queue command age.

13. One or more computer-readable storage media of a tangible article of manufacture encoding computer-executable instructions for executing on a computer system a computer process, the computer process comprising:
    assigning an age-based probability to each of multiple pending commands in an execution queue based on an in-queue age of each of the commands, the age-based probability of each command increasing in proportion to an associated in-queue age of the command and representing a percentage of total commands in a target latency distribution that are to be executed at or before reaching the in-queue age of the command; and
    probabilistically selecting a command for execution from the execution queue based on the age-based probability assigned to of the command.

14. The one or more computer-readable storage media of claim 13, wherein the computer process further comprises:
    selecting some commands for execution from the execution queue based on in-queue command age and other commands for execution from the execution queue based on estimated access time to an associated storage location.

15. The one or more computer-readable storage media of claim 13, wherein probabilistically selecting the command further comprises:
    selecting a random number; and
    executing the command responsive to a determination that the age-based probability value and the random number satisfy a predetermined correlation.

16. The one or more computer-readable storage media of claim 15, wherein the computer process further comprises:
    postponing execution of the command and selecting another command from the execution queue associated with a shortest estimated access time responsive to a determination that the age-based probability value and the random number fail to satisfy the predetermined correlation.

17. The one or more computer-readable storage media of claim 13, wherein probabilistically selecting the command further comprises executing selection logic based on a target in-queue latency distribution, the selection logic providing age-based probabilistic command selections to cause an actual in-queue latency distribution of a storage device to match the target in-queue latency distribution.

\* \* \* \* \*